United States Patent Office 2,860,563
Patented Nov. 18, 1958

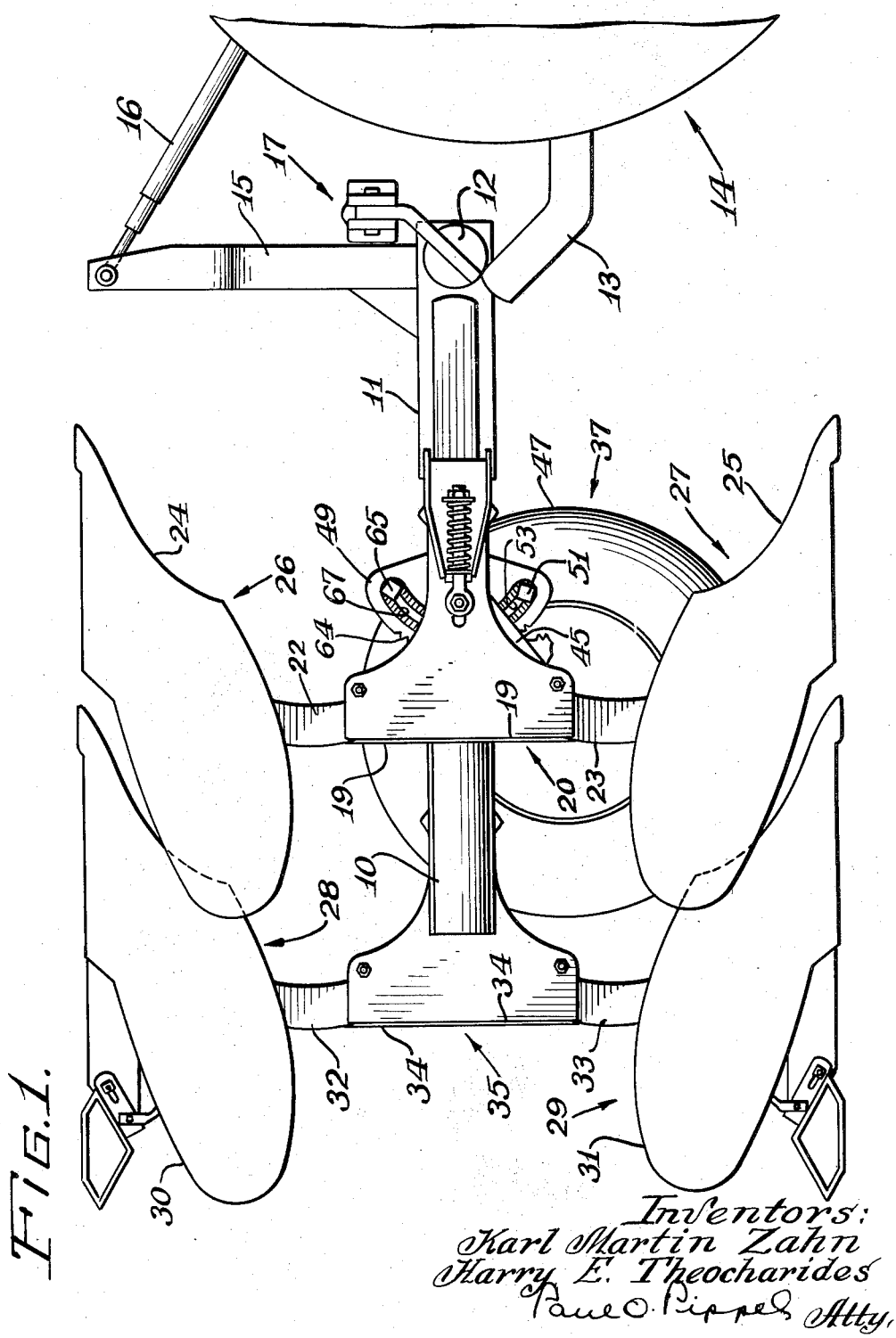

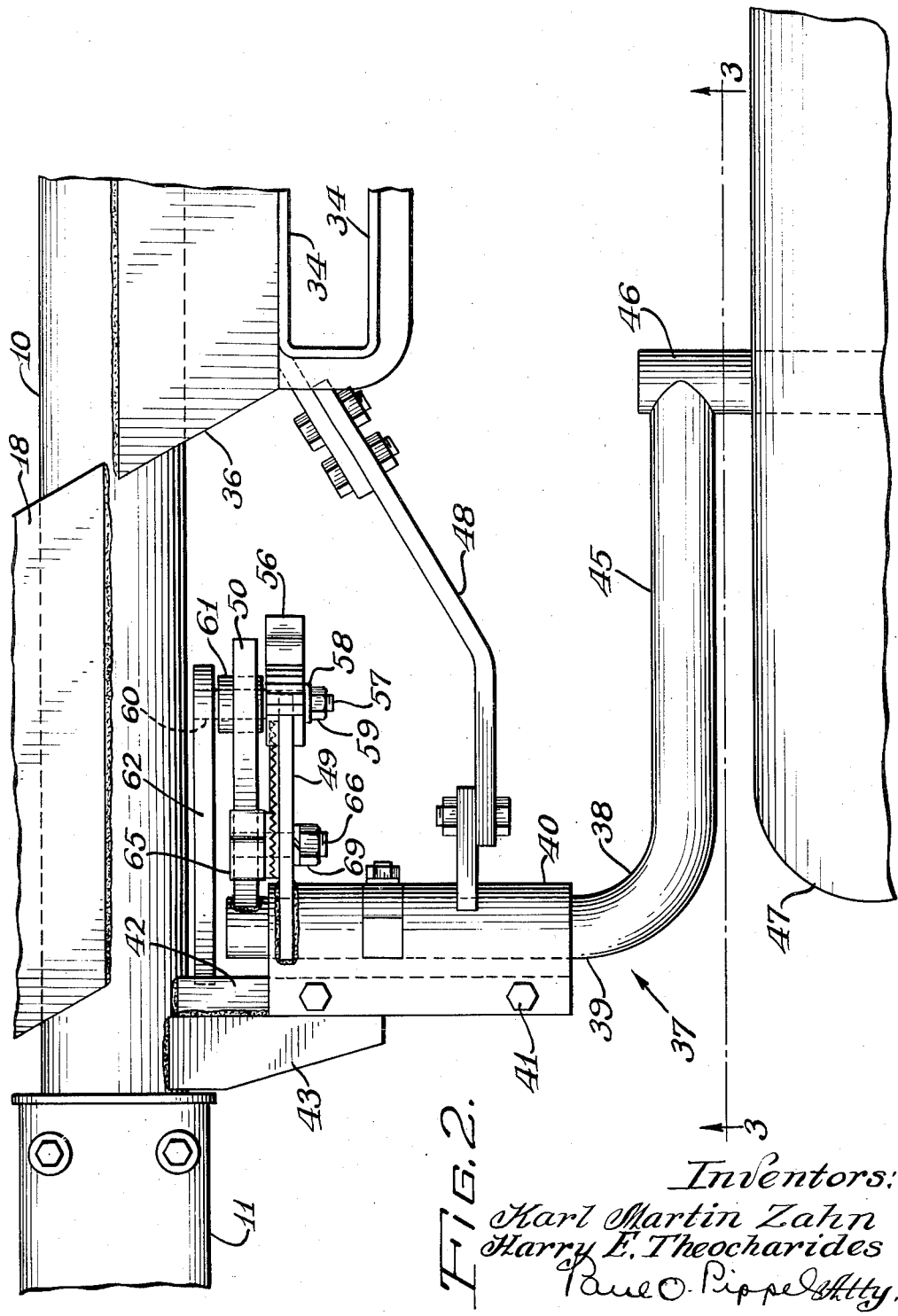

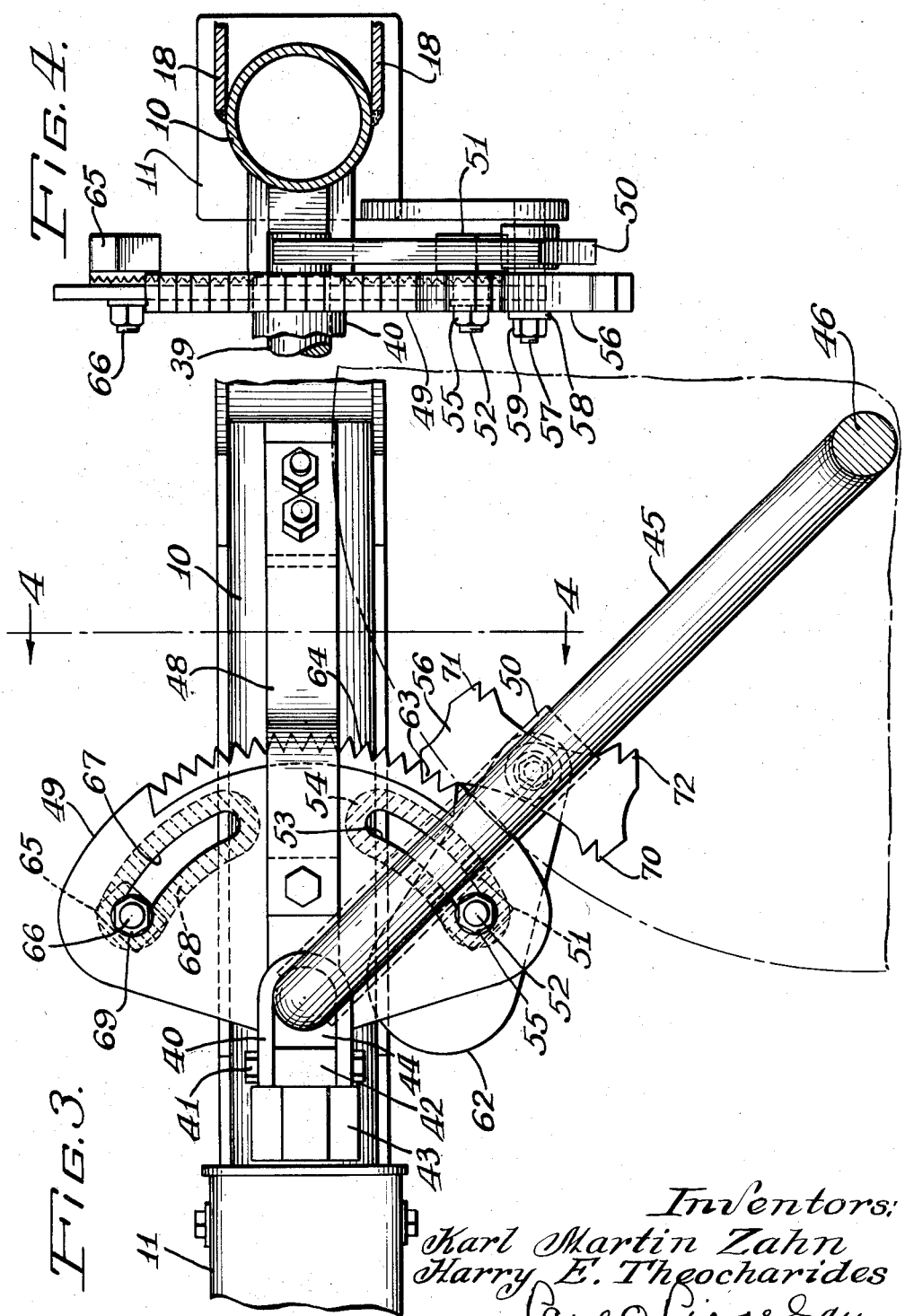

2,860,563

GAUGE WHEEL MOUNTING

Karl Martin Zahn and Harry E. Theocharides, Stockton, Calif., assignors to International Harvester Company, a corporation of New Jersey Application April 30, 1956, Serial No. 581,400

4 Claims. (Cl. 97—26)

This invention relates to two-way plows, and particularly to a two-way plow of the roll-over type wherein right and left hand plowing units are mounted on a support extending longitudinally of the direction of travel of the plow and rotatable about the axis thereof to dispose the plow units alternately in operation. More specifically the invention concerns a novel gauge wheel mounting for a two-way plow.

An object of the invention is the provision of a novel two-way plow including alternately operable right and left hand plow units and having a single gauge wheel adapted to function as the gauging means for both of said plow units.

Another object of the invention is the provision of novel means for mounting a gauge wheel on a two-way plow frame.

A further object of the invention is the provision, in a two-way plow of the roll-over type, wherein right and left hand plowing units are mounted on a rotatable carrier for alternate operation, of a novel gauge wheel assembly mounted on the rotatable carrier for rotation therewith and movable automatically into a position to always serve as the gauging means for the plow unit in operation.

Another object of the invention is the provision, in a two-way plow of the roll-over type, of a mounting for a single gauge wheel adapted to function as a gauging means for each of the alternating plow units wherein novel gravity operated means are provided for automatically locking the gauge wheel in its operative position.

Other objects and advantages of the invention will become clear from the following detailed description when read in conjunction with the accompanying drawings wherein:

Figure 1 is a view in side elevation, partly in section, of a tractor-mounted two-way plow embodying the features of this invention;

Figure 2 is an enlarged detail, with parts removed for clarity, showing the manner in which the gauge wheel is mounted upon the rotatable tool carrier;

Figure 3 is a view taken along the line 3—3 of Figure 2; and

Figure 4 is a sectional view taken on the line 4—4 of Figure 3.

The general construction of a two-way plow having the gauge wheel assembly of this invention mounted thereon is illustrated in Figure 1 and includes a longitudinally extending rotatable cylindrical tool carrier 10, the forward end of which is rotatably mounted in a housing 11 having a hitch structure at its forward end including a transversely extending cylindrical beam 12 to the ends of which are affixed forwardly extending draft connections 13, only one of which is shown, adapted for attachment to suitable implement attaching apparatus, not shown, on the tractor 14. An upright 15 mounted on the housing 11 is also connected by a link 16 to the tractor.

Tool carrier 10 is revolved about its longitudinal axis in housing 11 by power means such as the hydraulic ram indicated at 17 and operatively connected to the carrier 10 for rotation thereof by any suitable motion transmitting means, not shown, which forms no part of the invention as claimed herein.

The implement of this invention is a two bottom two-way plow and the rotatable carried 10 constitutes the plow support. A pair of vertically spaced members 18 are welded to the upper and lower sections of the tubular carrier 10 and extend laterally from the right hand side thereof and provide a support for a pair of plates 19 forming a tool supporting bracket 20. A pair of oppositely directed beams 22 and 23 are mounted between the plates 19 and carry at their ends left and right hand plow bottoms 24 and 25, beams 22, 23 and plow bottoms 24, 25 forming alternately operating plowing units 26 and 27. A substantially duplicate pair of plowing units 28 and 29 are spaced rearwardly and laterally from the forward plow units 26 and 27 and comprise left and right hand plow bottoms 30 and 31 mounted, respectively, upon the ends of oppositely directed beams 32 and 33, which are mounted between the laterally spaced plates 34 of a bracket 35, which is substantially the same as bracket 20 and is affixed to a pair of vertically spaced members 36, similar to members 18, but extending laterally on the left hand side of carrier 10.

The details of the mechanism by which the alternately operating plowing units 26, 27 and 28, 29 are mounted upon the respective brackets 20 and 35 form no part of this invention.

Suitable lifting mechanism, not shown, is provided on the tractor 14 and is operatively connected to the shafts 13 and link 16 to raise and lower the implement of this invention. Also, as pointed out hereinbefore, suitable means in the form of a ram 17 is provided for revolving the tool carrier 10 through 180° to alternately place the plowing units in operation when reversing the plowing direction at the end of a field, for example, revolving the carrier until lefthand plowing units 26 and 28 occupy the operating position of right hand units 27 and 29, and the latter move to the inoperative position.

For regulating the operating depth of the plowing units, common gauging means 37 is provided for alternately gauging the depth of operation of both left hand and right hand plowing units. This gauge means comprises a crank axle 38 having a transversely extending part 39 rotatably carried in a U-shaped housing 40 affixed by bolts 41 to the lateral extension 42 of a bracket 43 welded to the tubular carrier 10 and projecting laterally therefrom. A spacer block 44 is provided between the extension 42 and the transverse portion 39 of the crank axle to confine the latter in the housing. Crank axle 38 has an arm portion 45 bent at right angles to the transverse part 39 and extending downwardly and rearwardly when viewed in the position of the parts shown in Figures 1 and 3. A stub axle 46 at the lower end of arm 45 projects outwardly and has mounted thereupon a gauge wheel 47. The gauge wheel assembly 37 is strengthened by the provision of a brace 48 extending between the housing 40 and plate members 36. In Figures 1 and 3 it will be observed that gauge wheel 47 is in position for gauging the operating depth of the right hand plow units 27 and 29. Increase or decrease in the operating depth of the bottoms 25 and 31 is made by effecting vertical adjustment in the position of the gauge wheel relative thereto.

A quadrant 49 is welded to housing 40 and extends rearwardly therefrom parallel to arm 45 of crank axle 38. Another arm 50 is welded to and extends rearwardly from the inner end of the transverse portion 39 of the crank axle and is also parallel to the arm portion 45. Downward movement of wheel 47 relative to the operating plow units is limited by the provision of a rectangular block 51 mounted on a bolt 52 which extends through and is seated in the lower end of an arcuately shaped slot 53 provided in the lower end of quadrant 49, rimmed by teeth 54 for providing a secure foothold to maintain block 51 in the position selected when a nut 55 on bolt 52 is tightened. Block 51 is engageable by arm 50 to limit the downward swinging of crank axle 38 and is eccentrically shaped so that by rotation thereof finer depth adjustments can be made. Adjustment in the vertical position of arm 45 of the crank axle can, of course, be made by adjusting the position of bolt 52 in slot 53.

Wheel axle 45 is locked in an operating position on the quadrant 49 and arm 50 is held against block 51 by the provision of gravity operated locking means in the form of a latch block 56 pivotally mounted upon a bolt 57 carried at the outer end of arm 50 and held thereon by a washer 58 and a nut 59.

Bolt 57 is provided with an enlarged portion 60 rotatably received in a bearing 61 carried at the end of arm 50 and the projecting end of the enlarged portion 60 of the bolt has affixed thereto one end of a counterweight 62.

It will be noted particularly well in Figure 3 that latch block 56 is provided at one end with teeth 63 adapted for engagement with teeth 64 on quadrant 49. It will also be noted that counterweight 62 is overcenter with respect to the axis of bolt 57 and urges the latch block 56 into engagement with the quadrant to hold the wheel arm 45 against upward movement with respect to tool carrier 10.

When tool carrier 10 is revolved 180° to raise operating plow units 27 and 29 to an inoperative position while lowering the left hand units 26 and 28 to an operating position, gauge wheel assembly 37 revolves bodily therewith through 180°. Wheel arm 45 and gauge wheel 47 are thus swung in a vertical plane from a position below the axis of the tool carrier 10 to a position vertically thereabove. When this occurs counterweight 62 reaches a position where it is overcenter in the opposite direction relative to latch block 56 so that the latch block is rocked away from quadrant 49 until teeth 63 are disengaged from teeth 64, whereupon wheel arm 45 and wheel 47 fall by gravity to a position again below the axis of the tool carrier 10 and into gauging relation with the left hand plowing units 26 and 28. Arm 45 of crank axle 38 then swings downwardly and arm 50 engages another stop block 65 mounted upon a bolt 66 slidably received in another arcuate slot 67 in the other end of quadrant 49. Slot 67 is also rimmed by teeth 68 for engagement by a nut 69 to hold block 65 in an adjusted position in the slot 67. When arm 50 engages the block 65 counterweight 62 swings latch block 56 in a direction to urge an oppositely disposed set of teeth 70 into engagement with teeth 64 of the quadrant to lock the crank axle and the gauge wheel in its alternate operating position for the alternately operating set of plow units.

Intermediate and finer adjustments in the position of arm 50 and therefore of crank arm 45 relative to quadrant 49 may be made by reversing latch block 56 on bolt 57 so that a set of teeth 71 at one end of the block or teeth 72 at the other end of the block will come into engagement with the teeth of the quadrant. It will be observed particularly well in Figure 3 that the spacing between teeth 71 and 72 is less than the spacing between teeth 63 and 70 on the opposite side of the latch block so that finer adjustments in the position of the latch block and therefore of the gauge wheel are possible.

It is believed that the operation of the novel gauge wheel assembly of this invention should be understood from the foregoing description. It may be noted, however, that the invention has been described in its preferred embodiment only, and that modifications may be made in the invention without departing from the spirit thereof or the scope of the appended claims.

What is claimed is:

1. For use with a two-way plow of the type including a support having right and left hand plow units mounted thereon and rotatable about a longitudinal axis to place the plow units alternately in operation: a common gauge wheel for both said units and means for mounting said wheel on the support for rotation therewith, comprising a toothed quadrant secured to the support, a wheel-carrying arm pivotally mounted on the quadrant, said arm and wheel unit being rotatable bodily with the support from a gauging position relative to the operating plow unit to a raised position when the alternate plow unit is moved to operating position, said arm and wheel being swingable by gravity downwardly over said quadrant to an operating position with respect to the alternate plow unit, a latch member pivotally mounted on said wheel arm having a set of teeth at each end thereof, the teeth on opposite ends of said latch member being in cooperative engagement with the teeth of said quadrant in alternate operating positions of said gauge wheel to lock the wheel in its operating position.

2. For use with a two-way plow of the type including a support having right and left hand plow units mounted thereon and rotatable about a longitudinal axis to place the plow units alternately in operation: a common gauge wheel for both said units and means for mounting said wheel on the support for rotation therewith, comprising a toothed quadrant secured to the support, a wheel-carrying arm pivotally mounted on the quadrant, said arm and wheel unit being rotatable bodily with the support from a gauging position relative to the operating plow unit to a raised position when the alternate plow unit is moved to operating position, said arm and wheel being swingable by gravity downwardly over said quadrant to an operating position with respect to the alternate plow unit, a patch member pivotally mounted on said wheel arm having a set of teeth at each end thereof, the teeth on opposite ends of said latch member being in cooperative engagement with the teeth of said quadrant in alternate operating positions of said gauge wheel to lock the wheel in its operating position and gravity operated means effective, when said wheel and arm unit has been raised to an inoperative position with the associated plow unit, to pivot said latch member out of cooperative engagement with said quadrant to accommodate downward swinging of the wheel and arm about the axis of the latter on the support.

3. The invention set forth in claim 2, wherein said gravity operated means is a counterweight affixed to the latch member and effective during movement of the wheel and arm unit from operating to inoperative position to rock the latch member about its pivot axis to cause the teeth at opposite ends thereof to alternately engage the quadrant.

4. The invention set forth in claim 2, wherein an optionally operable set of teeth is provided on said latch member for engagement with said quadrant to effect intermediate adjustments in the position of said wheel relative to the support.

References Cited in the file of this patent
UNITED STATES PATENTS 2,637,256    Lindeman _____ May 5, 1953
2,773,439    Chandler _____ Dec. 11, 1956